United States Patent Office 2,778,587
Patented Jan. 22, 1957

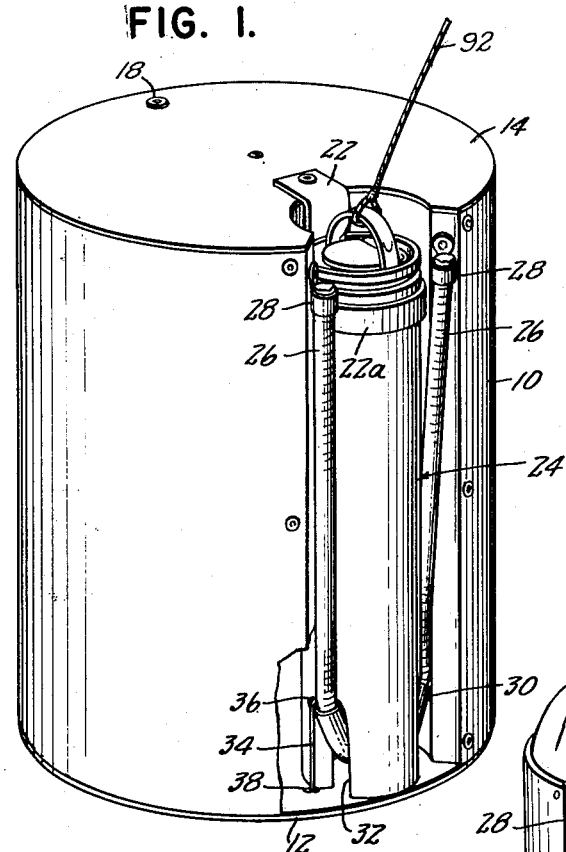
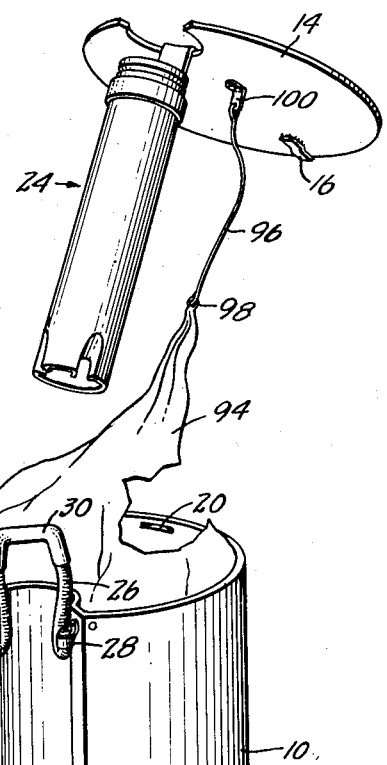
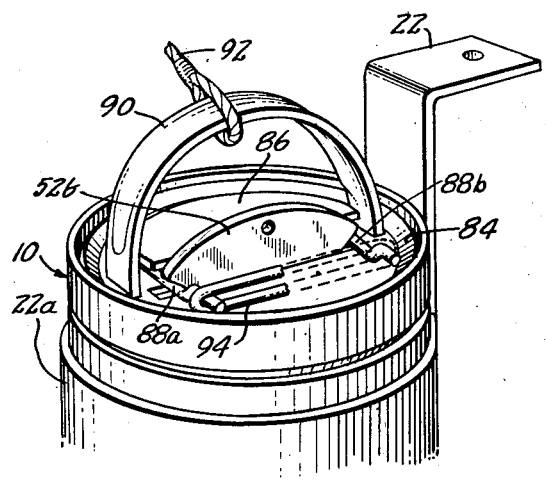

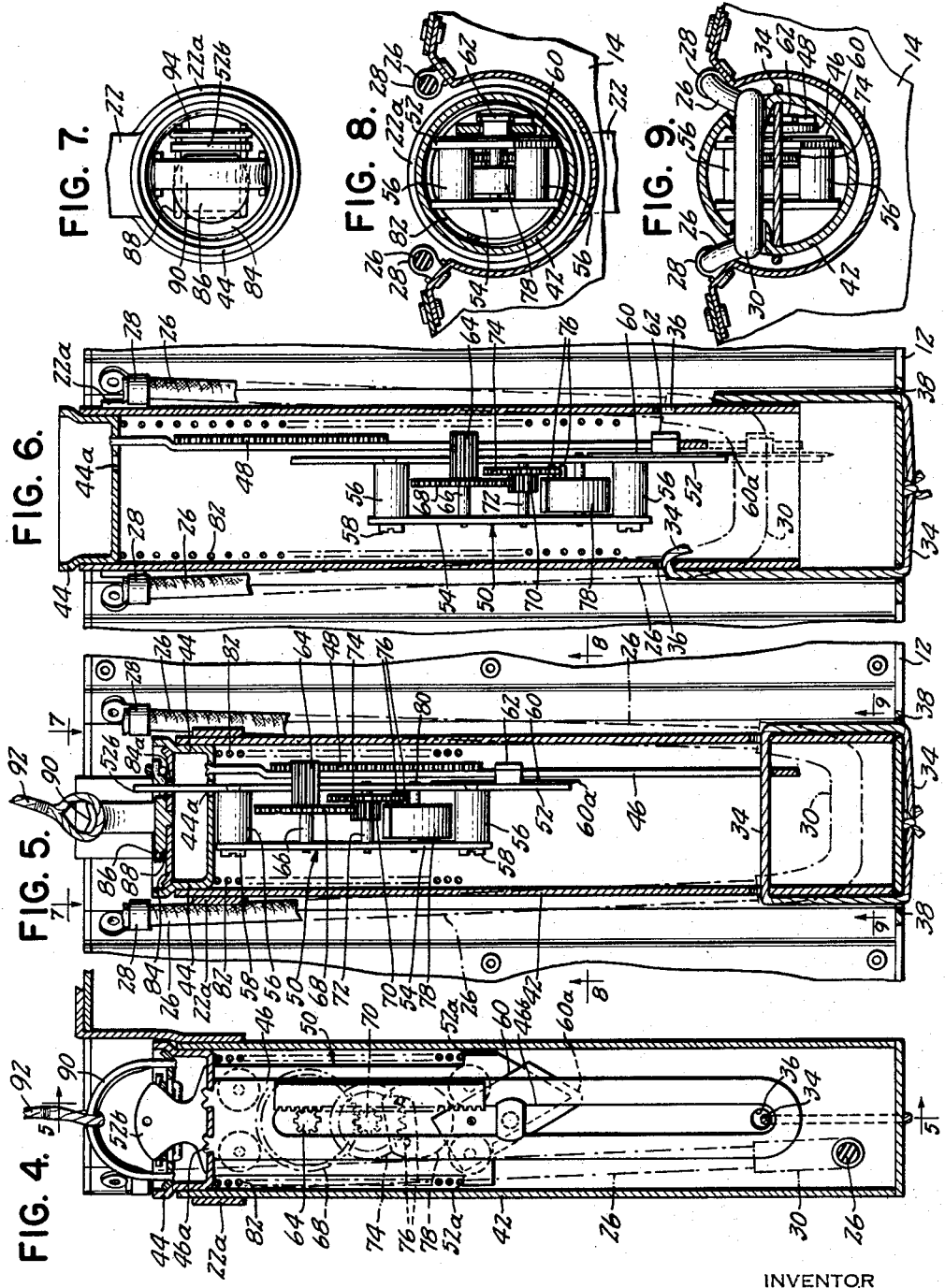

2,778,587

DELAYED OPENING PARACHUTE CASE

Harold J. Moran, Trenton, N. J., assignor to Switlik Parachute Company, Inc., Trenton, N. J.

Application April 18, 1955, Serial No. 501,993

6 Claims. (Cl. 244—150)

The present invention relates to automatic delayed opening parachute equipment of the type used to support radio transmitting apparatus or other materiel dropped from aircraft flying at high speeds.

To obtain meteorological data in areas where no ground meteorological stations are located, for example in the Arctic zones, it has become customary to drop from aircraft flying over these areas parachute-supported radio transmitting apparatus which, during descent, transmits radio signals varying in accordance with the ambient temperature, barometric pressure, and other measurable factors useful in weather analysis and prediction.

The high rate of speed at which modern aircraft normally fly gives rise to a problem in the use of parachute equipment of the type described. If the parachute were released immediately upon being dropped from the aircraft, the shock of sudden opening of the parachute canopy would be apt to damage or destroy the delicate radio equipment. It is therefore highly desirable or even necessary to provide a parachute case which automatically opens and releases the parachute a predetermined time interval after it is dropped from the aircraft, thereby allowing the equipment to decelerate gradually to a velocity sufficiently low to prevent damage when the parachute opens. The delay in opening of the parachute also prevents fouling of the canopy or shroud lines in the tail empennage of the aircraft from which it is dropped.

Another problem involved in the use of such equipment concerns the fact that it is most frequently used in polar regions where extremely low temperatures are encountered. It is, moreover, often stored for a considerable period before use. One of the deficiencies of previous parachute equipment of this type has been the use of rubber cords to supply the force of opening the parachute case, since these rubber members were apt to lose their elasticity and become brittle when exposed to extremely low temperatures or when stored for extended periods.

One previous type of delayed opening parachute case has employed an explosive charge with a time delay fuse to provide the desired time delay. This equipment has therefore been subject to all of the defects, hazards, and limitations in the use of explosive charges.

The parachute equipment is normally retained in a a chamber in the lower portion of the aircraft fuselage and, when it is desired to drop the parachute equipment, a trap door communicating with this chamber is opened to permit the parachute equipment to fall from the plane. One of the difficulties with previous equipment has been that it has had projecting parts which were apt to become snagged in the chamber and prevent proper discharge of the equipment from the aircraft.

It is the purpose of the present invention to provide an improved automatic delayed opening parachute case for parachutes of the type described wherein all of the aforementioned difficulties are eliminated—in other words, an equipment which is simple in construction and reasonable in cost, and which is foolproof in operation under any conditions likely to be encountered.

In the drawings,

Figure 1 is a perspective view of a parachute case embodying features of the present invention.

Figure 2 is an enlarged fragmentary view of the upper end of the timer mechanism of said case.

Figure 3 is a perspective view, at somewhat smaller scale than Figure 1, showing the parachute case in the process of opening.

Figure 4 is a vertical sectional view through the timer mechanism, taken on a plane axial to the parachute case, at a scale slightly larger than that of Figure 1.

Figure 5 is a vertical sectional view taken at right angles to the view of Figure 4, generally along the line 5—5 of Figure 4.

Figure 6 is a view similar to Figure 5 but showing the timer mechanism an instant after the static line has been pulled and as the parachute case is in the process of opening.

Figures 7, 8, and 9 are transverse sectional views through the timer mechanism taken respectively along the lines 7—7, 8—8, and 9—9 of Figure 5.

As may be seen in Figure 1, the parachute case of the present invention includes a generally cylindrical container 10 adapted to enclose the parachute canopy and shroud lines. This container 10 is closed at its lower end by a fixed bottom 12 which is provided at its lower surface with suitable fasteners for attachment of the cases in which the batteries and the radio transmitter or other equipment are housed. The container 10 is provided at its upper end with a removable lid 14 having at one edge a projecting latch member or catch portion 16 (Figure 3) which is held in place by a rivet 18 (Figure 1) and which projects from the edge of the lid into a recess 20 (Figure 3) formed at the inner surface of the container 10 near its upper edge.

At the opposite side of the lid 14 is riveted a clamp 22 which extends downwardly from the lid and includes a cylindrical band portion 22a which encircles the upper end of the cylindrical housing of a timer assembly which is generally indicated 24 and which is received in a conforming recess in the side wall of the container 10.

The latter side of the lid 14 and the timer assembly 24 are urged in an upward direction by means of an elongated tension spring 26, the two ends of which are attached to the container 10 near its upper edge by connectors 28. The central portion of the spring 26 is stretched downwardly in sling fashion and passes through a U-shaped sleeve 30 which is engaged in opposed notches in the lower end of the timer housing. The timer assembly 24 and the lid 14 are normally held down in container closing position, as shown in Figure 1, against the force of the spring 26, by means of a string 34 which passes through openings 36 in opposite sides of the timer housing near its lower end and through openings 38 in the bottom 12 of the container, with the two ends of the string, as shown in Figure 5, being tied together beneath the bottom 12 of the container to form a closed loop.

The timer 24 serves the function of severing the string 34 and permitting the spring 26 to open the parachute case a predetermined time interval after the parachute is dropped from the aircraft. The mechanism of the timer is shown in detail in Figures 4–9.

As may be seen in these figures, the timer mechanism is enclosed in a tubular housing 42 which is closed at its upper end by a recessed cap 44 which is snugly received into the upper end of the housing 42 and permanently secured, as by spot welding. Extending along most of the interior length of the housing is a fixed guide 46 which is secured at its upper end to the cap 44 by means of prongs 46a which extend through slots in the cap 44 and are staked over against the outer surface of the cap. The guide 46 has along substantially its full length a slot 46b. Secured to one face of the guide 46 near its upper end is a longitudinally extending rack 48, the teeth of which project into the upper portion of the slot 46b.

Supported on the guide 46 for sliding movement longitudinally thereof is a carriage generally indicated 50. As shown most clearly in Figure 5, this carriage 50 includes a pair of side plates 52 and 54 which are held in parallel spaced relation by spacing sleeves 56 and screws 58. Mounted near the lower end of the side plate 52 is a knife 60, the cutting edge 60a of which projects beneath the lower edge of the side plate 52 toward the portion of the string 34 which extends through the lower end of the housing 42.

The lower end of the carriage 50 is slidably supported in the slot 46b of the guide 46 by a key member 62 which projects from the side plate 52 through the slot 46b and is provided with an enlarged head to prevent its withdrawal from the slot. Mounted near the upper end of the carriage 50 in meshing engagement with the rack 48 is a pinion 64 which is fixed at one end of a shaft 66 whose opposite end is journalled in the side plate 54. Also fixed on the shaft 66 is a larger spur gear 68 which meshes with a pinion 70 fixed on a shaft 72 whose opposite ends are rotatably journalled in the side plates 52 and 54. Fixed on this same shaft 72 is an escapement wheel 74 having spaced teeth which cooperate with two escapement pins 76 on a flywheel 78 which is mounted on a shaft 80, the opposite ends of which are rotatably journalled in the side plates 52 and 54.

The carriage assembly 50 is urged downwardly along the guide 46 by means of a coil spring 82 which encircles the carriage and which is compressed between the inner face of the top cap 44 and a pair of upwardly-directed shoulders 52a (Figure 4) formed near the lower end of the side plate 52 of the carriage. However, the carriage assembly 50 is normally held in the upper, retracted position in which it is shown in Figures 4 and 5, against the force of the spring 82, by a latch mechanism which includes a bell-shaped head 52b projecting upwardly from the side plate 52 of the carriage through a slot 44a in the top cap 44 and through a slot 84a in an inwardly-dished circular plate 84 which is received in the enlarged upper portion of the cap 44.

Fixed at the outer surface of the plate 84 is a cleat 86 which, as shown in Figure 7, is generally circular but is flattened on one side adjacent the head 52b. As shown in Figure 5, the edges of the cleat 86 are undercut to receive a U-shaped spring 88 which fits snugly around the cleat 86 and has a pair of generally parallel legs 88a and 88b which, as shown in Figure 2, project beneath the opposite edges of the enlarged head 52b. The spring 88 is strong enough to hold the carriage in the upper position against the force of the coil spring 82. However, if the plate 84 is pulled upwardly, the flared edges of the head 52b cam apart the legs 88a and 88b of the spring 88 and release the carriage. For this purpose a semi-circular bail 90 is attached to the plate 84 to furnish a convenient means of attaching one end of a static line 92 whose opposite end is attached to the frame of the aircraft. A "keeper" 94 (Figures 2 and 7) prevents spreading of the legs 88a and 88b and maintains the timer in a "safe" condition during storage and handling. This "keeper" is removed to "arm" the timer before flight.

When the parachute is dropped from the aircraft, after a short free fall and when the end of the static line 92 is reached, the plate 84 is pulled off the end of the timer assembly, freeing the head 52b from the spring 88, and allowing the carriage to be moved downwardly along the guide 46 by the spring 82.

As the carriage moves along the slide, the pinion 64 is driven by the rack 48. This in turn drives the spur gear 68 and, at a higher rotational speed, the pinion 70 and the escapement wheel 74. The escapement wheel 74 is permitted to rotate only one tooth at a time by rocking oscillational movement of the flywheel 78. Because of the considerable inertia of the flywheel 78, it has a relatively lengthy period of oscillation and permits only a slow movement of the carriage. It takes a period of the order of five to ten seconds for the pinion 64 to reach the lower end of the rack 48. When this happens, the carriage is freed so that the spring 82 can accelerate the carriage quite rapidly toward the lower end of the housing 42, as shown in Figure 6. As the carriage 50 approaches the lower end of the housing 42, the cutting edge 60a of the knife 60 will pass through the string 34 and sever it.

As may be seen particularly in Figures 4 and 5, the string 34 extends through the lower end of the slot 46b and the cutting edge 60a of the knife is positioned very close to the adjacent face of the guide 46 so that the lower end of the slot 46b supports the string 34 and cooperates with the knife 60, in shears-like fashion, to insure proper cutting of the string. The downward travel of the carriage 50 ends when the key member 62 engages the lower end of the slot 46b in the guide 46.

Severing of the string 34 frees the timer assembly and allows the spring 26 (Figure 1) to pull the timer and the lid 14 upwardly as shown in Figure 6. The catch 16 (Figure 3) initially acts as a hinge, but is ultimately disengaged from the recess 20, freeing the lid 14 entirely, as shown in Figure 3. As the lid flies off, the parachute canopy 94 is pulled out of the container 10 by means of a cord 96 which is attached at one end to a grommet 98 at the peak of the canopy 94 and at its other end to a connector 100 riveted to the undersurface of the lid 14. As the container 10 continues to fall, the canopy 94 will be inflated. The skirt of the canopy is attached by shroud lines and risers, in conventional fashion, to the bottom 12 of the container 10. The parachute thus supports the container 10 and the equipment secured thereto.

From the foregoing description, it may be seen that the parachute container described is relatively simple in construction and operation and yet is capable of reliably and automatically releasing the parachute a predetermined time interval after it is dropped from the aircraft. It will therefore be appreciated that the aforementioned objectives of the invention have been fulfilled and that a parachute equipment has been provided which is without the aforementioned disadvantages of previous types of automatic delayed opening parachute cases. However, it should be emphasized that the particular embodiment of the invention which is shown and described herein is intended as merely illustrative and not as restrictive of the invention.

I claim:

1. A delayed opening parachute case comprising a container, open at the top, adapted to enclose a parachute, a lid closing the top of said container, said lid having at one side a catch portion hingably engaging said container, a timer in an elongated housing secured at its upper end to the opposed side of said lid and extending downwardly along the outside of said container, and being received in a recess formed in the wall of said container so as to be substantially flush with the outer wall thereof, an elongated tension spring connected at its opposite ends to the outer wall of said container near its upper edge and the central portion of said spring being stretched downwardly and hooked under tension beneath the lower portion of said housing to urge said housing and said lid upwardly, a fastener engaging said housing to hold said lid down in closing position on said container against the force of said spring, said timer including a releasing element adapted for connection to a static line and a movable member adapted to cooperate with said fastener and disengage the same a predetermined time interval after said static line is pulled to allow said tension spring to open said lid and release said parachute.

2. A delayed opening parachute case comprising a container, open at the top, adapted to enclose a parachute, a lid closing the top of said container, said lid having at one side a catch portion hingably engaging said container, a timer in an elongated housing secured at its upper end to the opposed side of said lid and extending downwardly along the side of said container, an elongated tension spring connected at its opposite ends to the outside of said container near its upper edge and the central portion of said spring being stretched downwardly and hooked under tension beneath the lower portion of said housing to urge said housing and said lid upwardly, a string looped through the lower end of said housing and tying the same down against said container to hold said lid down in closing position on said container against the force of said spring, said timer including a releasing element adapted for connection to a static line and a movably mounted knife member, a spring urging the cutting edge of said knife toward said string, and means normally holding said knife away from said string, said means being releasable a predetermined time interval after said static line is pulled, to permit said knife to cut said string and allow said tension spring to press said lid open and release said parachute.

3. In a delayed opening parachute case of the type including a string fastener, a timer comprising an elongated housing having near one end opposed openings to receive a length of said string extending transversely of said housing, a carriage mounted in said housing for movement longitudinally thereof, a knife having its cutting edge projecting toward said string from the adjacent end of said carriage, a spring urging said carriage and said knife toward said string, a latch normally holding holding said carriage in a retracted position away from said string against the force of said spring, said latch having means for attachment to a static line whereby pulling said static line will release said latch, gear means linking said carriage and said housing, said gear means including a pinion and a longitudinally extending rack which meshes therewith during the first part of the movement of said carriage, an escapement member mounted for oscillatory movement and having a driving connection with said gear means to limit the velocity of said carriage during the portion of its movement that said pinion and said rack are in meshing engagement.

4. In a delayed opening parachute case of the type including a fastener normally holding said case closed, a timer comprising an elongated housing having near its lower end an opening to receive part of said fastener, and at its upper end a removable cap with means for attachment to a static line, a guide extending longitudinally of said housing, a carriage mounted in said housing for movement along said guide, said carriage having at its upper end an enlarged head portion extending through said cap and near its opposite end a surface adapted to cooperate with said portion of said fastener to cause disengagement of said fastener, a coil spring compressed between a portion of said carriage and the upper end wall of said housing and urging said carriage downwardly along said guide, a generally U-shaped spring clip having its opposed legs engaging the opposite sides of the head portion of said carriage to maintain said carriage normally in a retracted position in the upper portion of said housing against the force of said coil spring, a rack on the upper portion only of said guide and a clock mechanism on said carriage, said clock mechanism including a pinion meshing with said rack and an escapement member mounted for oscillatory movement and having a driving connection with said pinion to limit the velocity of said carriage during only the first portion of its movement.

5. In a delayed opening parachute case of the type including a string fastener, a timer comprising an elongated housing having near its lower end opposed openings to receive a length of said string extending transversely of said housing, and at its opposite end a removable cap with means for attachment to a static line, a guide extending longitudinally of said housing, a carriage mounted in said housing for movement along said guide, said carriage having an enlarged head portion extending through said cap, a knife having its cutting edge projecting toward said string from the adjacent end of said carriage, a coil spring compressed between a portion of said carriage and the upper end wall of said housing and urging said carriage and said knife downwardly toward said string, a generally U-shaped spring clip having its opposed legs engaging the opposite sides of the head portion of said carriage to maintain said carriage normally in a retracted position in the upper portion of said housing against the force of said coil spring, a rack on the upper portion only of said guide and a clock mechanism on said carriage, said clock mechanism including a pinion meshing with said rack and an escapement member mounted for oscillatory movement and having a driving connection with said pinion to limit the velocity of said carriage during only the first portion of its movement.

6. A delayed opening parachute case comprising a container, open at the top, adapted to enclose a parachute, a lid closing the top of said container, said lid having at one side a catch portion hingably engaging said container, a timer in an elongated housing secured at its upper end to the opposite side of said lid and extending downwardly along the outside of said container, and being received in a recess formed in the wall of said container so as to be substantially flush with the outer wall thereof, a spring urging said housing and said lid upwardly, a fastener engaging said housing to hold said lid down in closing position on said container against the force of said spring, said timer including a releasing element adapted for connection to a static line and a movable member adapted to cooperate with said fastener and disengage the same a predetermined time interval after said static line is pulled to allow said tension spring to open said lid and release said parachute.

References Cited in the file of this patent

UNITED STATES PATENTS

| | | |
|---|---|---|
| 1,777,188 | Wiley | Sept. 30, 1930 |
| 2,606,729 | Frieder | Aug. 12, 1952 |